(12) United States Patent
Chan et al.

(10) Patent No.: US 6,384,599 B1
(45) Date of Patent: May 7, 2002

(54) SYSTEM, METHOD, AND PROGRAM FOR ANALYZING OFFSET TRACK ERRORS IN A STORAGE SYSTEM

(75) Inventors: Dennis R. Chan, Sunnyvale; Theofilos George Fkiaras, San Jose, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/495,550

(22) Filed: Feb. 1, 2000

(51) Int. Cl.[7] .......................... G11C 29/00; G01R 33/12
(52) U.S. Cl. .......................... 324/212; 360/31; 714/723
(58) Field of Search .................................. 324/210, 211, 324/212; 360/31, 53, 135, 137; 714/723

(56) References Cited

U.S. PATENT DOCUMENTS

| | | |
|---|---|---|
| 4,578,721 A | 3/1986 | Brannan, Jr. |
| 4,725,968 A | 2/1988 | Baldwin et al. |
| 4,939,599 A | 7/1990 | Chainer et al. |
| 4,949,036 A | 8/1990 | Bezinque et al. |
| 4,992,893 A | 2/1991 | Kanai et al. |
| 5,121,263 A | 6/1992 | Kerwin et al. |
| 5,873,659 A | 2/1999 | Edwards et al. |

OTHER PUBLICATIONS

Ashar, K.G., "Magnetic Disk Recording Integration" in: *Magnetic Disk Drive Technology, Heads, Media, Channel, Interfaces, and Integration* (New York, IEEE Press, 1997), pp. 238–267.

*Primary Examiner*—Walter Snow
(74) *Attorney, Agent, or Firm*—David W. Victor; Konrad Raynes Victor & Man

(57) ABSTRACT

In summary, preferred embodiments disclose a system, method, and program for generating and displaying disk drive performance data. A center stripe of one sector of one track on a recordable surface is read. An indication is made indicating whether the read operation to the center of the sector succeeded. Each offset stripe from the center of the track in the sector within the track is read and indication is made as to whether each read operation to each offset stripe succeeded. Output in human observable format is generated indicating whether each offset stripe and the center stripe for the sector and track were read successfully or could not be read.

24 Claims, 9 Drawing Sheets

```
FILE   S/N : F30083487A
**************************
  HEAD         : 0
  CYLINDER     : 5432
  START SECTOR : 145
  END SECTOR   : 180
  ECC OTF      : ON
  ERROR TYPES  : S = NO SYNCH BYTE FOUND, E = DATA CHECK, C = CRC ERROR, O = OTHER
**************************
           OFFSET STEP = 3 COUNTS = 2.34%
                                                                40
       ◀------ % NEG OFFSET ------ + ------ % POS OFFSET ------▶
    42      5         2       +        2         5       44   ▼
    ╱       0         5       +        5         0            ╲  SCT  SID   LBA
    ┌─────────────────────────────────────────────────────────┐
    765432109876543210987654321012345678901234567 145  40  19526487
    EEEEEEEEEEEEE_E_____+_____EEEEEEEEEEEEEE 146  40  19526488
    EEEEEEEEEEEEEE_____+_____EEESEESEEEEE 147  40  19526489
    EEEEEEEEEEEEE_____+_____EEEEEEEEEEE 148 SPL 19526490
    EEESSSESEEEEEE_____+_____EEEESEEEEEE 149  41  19526491
    EESSESSSSESEEEE_____+_____EEEEEEEEEE 150  41  19526492
    EEEEEEEEEEEEEEE_____+_____EESSSSSSEE 151  41  19526493
    EEEEEEEEEEEEEEE_____+_____EEEEEEEEEE 152 SPL 19526494
    EEESSSSESSEEEEE_____+_____EEESSSSESE 153  42  19526495
    EEEESESSSSEEE_____+_____EEEEEEEEEE 154  42  19526496
    EEEEEEEEEEEE_____+_____ESSSSSSESEE 155 SPL 19526497
    EEEEEEEEEEE_____+_____EEEESSEEEEEE 156  43  19526498
    ESESEEEEEEEE_____+_____E_EEEEEEEEE 157  43  19526499
    EEEEEEEEEEEE_____+_____EEEEEEEEEEE 158  43  19526500
    EEEESSEEEEEEEE_____+_____EEEEEEEEEEE 159 SPL 19526501
    EEEEEEEEEEEEEE_E_____+_____EEEEEEEEEEEE 160  44  19526502
    EEEEEEEEEEEEEEE_____+_____EEEEEEEEEEEEE 161  44  19526503
    EEEEEEEEEEEEEE_____EEESESSSSSEESEEEE_____E 162  44  19526504
    EEEEEEEEEEEEEEEEEEEEEESSSSSEEEEEE_____E___EEEEES 163  45  19526505
    EEEEESSSSESSSSSSSSSESE_____+__EEEEEEEEEEEEEEESSSSSSSSE 164  45  19526506
    SSSSSSSSSSSEEEE_____EEEEEEEEEEEEEEEEEEEEEEEEEEEEE 165  45  19526507
    SESSEESSSEEEE_____EEEEEEEEEEEEEEEEEEEEEEEEEEEE 166 SPL 19526508
    SESSSSSEEEEEEE_____EEESESSSSSSSSEEEEEEEEEEEEE 167  46  19526509
    EEEESSSSSSSEEEEEEEEEEEEEEEEEE_____EEEEEEEEEE 168  46  19526510
    EESSSSSSEEEEEEEEEESSSSSSSSEEEEEE_____EEEEEE 169  46  19526511
    EEEESSSEEEEEEEEEEEEESSSSSSSEEEEE_____EEEEESES 170 SPL 19526512
    EEEEEEEEEESEESSEEEEESEEEE__+___EEEEEEEEEEEEEEEESSSSSSS 171  47  19526513
    EEEEEEEEEEEEE_____EEEEEEEEEEEEEEEEESSSSSSEEEEE 172  47  19526514
    EEEEEEEEEEEEEEE_____+_____E_EEEEEEEEEEESSSSSEEE 173  47  19526515
    EEEEEEEEEEEEEEEEEE_E_____+_____EEEEESSSSSS 174  48  19526516
    EEEEEEEEEEEEEEEEEE_____+_____E_ESSSSSSS 175  48  19526517
    EEEEEEEEEEEEEEEEEE_____+_____EEEEEEEEEE 176  48  19526518
    EEEEESSSSEEEE_____+_____EEEEEEEEEESSSSEEE 177 SPL 19526519
    EESSSSEEEEEE_____+_____EEEEESSSSSSSSSEEEE 178  49  19526520
    EEEEEEEEEEE_____+_____EEEEEEESSSSEEEEE 179  49  19526521
    EEEEEEEEEEEE_____+_____EEEEEEESSEEEEEE 180  49  19526522
    EEEESESEEEEEEE_____+_____EEEEEEEEEEEE
```

FIG. 4

```
        FILE   S/N : F3005180
       ************************
         HEAD         : 0
         CYLINDER     : 1000
         START SECTOR : 0
         END SECTOR   : 20
         ECC OTF      : ON
         ERROR TYPES  : S = NO SYNCH BYTE FOUND, E = DATA CHECK, C = CRC ERROR, O = OTHER
       ************************
              OFFSET STEP = 3 COUNTS = 2.34%
           ◄----- % NEG OFFSET ------ + ------ % POS OFFSET -----►
               5          2       +       2          5
               0          5       +       5          0           SCT  SID  LBA
       ------------------------------------------------------------------------
       765432109876543210987654321 0123456789012345678901234567
       EESSESSSSSSSSSSSEEE_____+_____E_EEEEEEEEEEEESEEE   0    0   3769091
       SESSSSSSSSSEEEE_____+_____EESSSSESSSES   1    0   3769092
       EEESSSSSSSSSEEEE_____+_____EESSSSSSSSSSE  2    0   3769093
       EEEEEEEEEEEEEEE_____+_____EEEESSSESEESS  3    0   3769094
       ESSSSSSSSSESSSSSSSEE_____+_____E_EEEEESSSSSSSSSE     4  SPL  3769095
       EEESESSSSSSSSSSSS_____+_____SSESESEEEEEEEE 5    1   3769096
       EEEEEEEEEEEEEEEEEEEE_____+_____EESEESSSSSEEE  6    1   3769097
       EEEEEEEEEEEEEEEEEEEEE_____+_____EEEEEEEEEEEEE  7    1   3769098
       EEEEEEEEESSSSSSSSSESEEEEE__+_____EESEESSESEEEEEEE 8  SPL  3769099
       EEEEEEEEEEEEEEEEEEEEEEEEEEE+_____EESESSSESEEEEEE 9   2   3769100
       EEEEEEEEEEEEEEEEEEEEEEEEEE_+_____EEESSSSSSSSEE  10   2   3769101
       EEEEEEEEEEEEEEEEEEEEEEEEEEE EEE_____EEEEESESSEESSE 11  2   3769102
       EEEEEEEEEEEEEEESSSSSSSSSSE SEEEEE_____EEEEEESSSSSEESSE   12   2   3769103
       EEEEEEEEEEEEEEEESSSSSSSSSS SE_E_____EEEESSSSSSSEEEEEE  13   3   3769104
       EEEEEEEEEEEEEEEEEEEEEEEEEE EEEEEEE_____EEEEEEEEEEEEEEE   14   3   3769105
       EEEEEEEEEEEEEEEEEEEEEEEEEEE EEEEEEEEEEEEEEEEEEEEEEEEEEEEE 15   3   3769106
       EEEEEEEEEEEEEEEEEEEEEEEEEEE EEEEEEEEEEEEEEEESSSSSSSESE    16   3   3769107
       EEEEEEEEEEEEEEEEEE_E_____+_____EEEEEEEEEEEEE  17   4   3769108
       EEEEEEEEEEEEEEEE_____+_____EEEEEEEEEEEEE  18   4   3769109
       EEEEEEEEEEEEEE_____+_____EEEEESSEESSEE  19   4   3769110
       SESSSSSSEEEEEE_____+_____EEEEEEEEEEEEE  20   4   3769111
```

FIG. 5

```
   FILE  S/N : F30051807A
   ************************
     HEAD         : 0
     CYLINDER     : 1000
     START SECTOR : 0
     END SECTOR   : 20
     ECC OTF      : ON
     ERROR TYPES  : S = NO SYNCH BYTE FOUND, E=DATA CHECK, C=CRC ERROR, O=OTHER
   ************************
                 OFFSET STEP = 3 COUNTS = 2.34%
           ◄----- % NEG OFFSET ------ + ------ % POS OFFSET -----►
              5         2         +          2         5
              0         5         +          5         0        SCT  SID  LBA
   ---------------------------------------------------------------  ---  ---
   765432109876543210987654321 01234567890123456789 01234567
   EEEESSSSSSSSSSSEEEEE_____+_____EEEEEEEEEESESSEEE    0    0   3769091
   SSSSSSSSSSEEEEEE_____+_____   EEEESSSSESSSS     1    0   3769092
   ESSESSSSSSSSEEE_____+_____ E_EEEESSSSSSSSE     2    0   3769093
   EEEEEEEEEEEEEEE_____+_____ E_EEESSSSSSEE       3    0   3769094
   ESESSSSEESSSSSSSSSE_____+_____EEEEEEEESSSSSSSSSE   4   SPL  3769095
   SEESSSSSSSSSSSSSSEE_____+_____EEESEEEESSSSEEES     5    1   3769096
   EEEEEEEEEEEEEEEEE_E_____+_____  EEESSESSSSESEE     6    1   3769097
   EEEEEEEEEEEEEEEEEEEEE_____+_____EEEEEEEEEEEEEEEEE    7    1   3769098
   EEEEEEEEESSSSSSSSSSSEE_____+_____ESSSSSESSSEEEEEEEEE  8   SPL  3769099
   EEEEEEEEEEEEEEEEEEEEE_E_____ EEEEEEEEEEEEEEEEEEEEEEEEE    9    2   3769100
   EEEEEEEEEEEEEEEEEEEEEEEEE___ EESSSSESSSESSEEEEEEEEEEEE   10    2   3769101
   EEEEEEEEEEEEEEEEEEEEEEEEEEE__EEEEEEEEEEEEEEEEEEEEEEEEEE  11    2   3769102
   EEEEEEEEEEEEEEEEESSSSSSSSSS SEEEEEEEEEEEEEEEEEEEEEEEEE   12    2   3769103
   EEEEEEEEEEEEEEEEESSSSSSSSS SSEEEEEEEEESSSSSSSESEEESEE    13    3   3769104
   EEEEEEEEEEEEEEEEEEEEEEEEEEE EEEEEEEEEEEEEEEEEEEEEEEEEEE  14    3   3769105
   EEEEEEEEEEEEEEEEEEEEEEEEEEEE EEEEEEEEEEEEEEEEEEEEEEEEEE  15    3   3769106
   EEEEEEEEEEEEEEEEEEEEEEEEEEEE EEEEEEEEEEEEEESSSSSSSSSEE   16    3   3769107
   EEEEEEEEEEEEEEEEEEE_____+_____    EEEEEEEEEEEEE   17    4   3769108
   EEEEEEEEEEEE_EE_____+_____     EEEEEEEEEEEE   18    4   3769109
   EEEEEEEEEEEEEEE_____+_____     EEEESSESESEEE  19    4   3769110
   SSSSSSSEEEEEEEE_____+_____     EEEEEEEEEEEE   20    4   3769111
```

FIG. 6

```
************************
   HEAD         : 8
   CYLINDER     : 6000
   START SECTOR : 1                              FIG. 7a
   END SECTOR   : 14
   ECC OTF      : ON
   ERROR TYPES  : S = NO SYNCH BYTE FOUND, E=DATA CHECK, C=CRC ERROR, O=OTHER
COMMENTS :
************************
            OFFSET STEP = 3 COUNTS = 2.34%
      ←----- % NEG OFFSET ------+------ % POS OFFSET ----→
          5          2          +          2          5
          0          5          +          5          0           SCT  SID    LBA
      -------------------------------------------------------     ---  ---    ---
          76543210987654321098765432101234567890123456789012345 67
20%   EEEEEEEEEEEEEEEEEE_____+_____ EEEEEEEEE      1    0   21283716
      EEESSESEESSSSE_E_____+_____ EEEEEEEEEEEE   2    0   21283717
25%   EEEEEEEEEEEEEEEEEEE_____+_____ EESEESSE       3   SPL  21283718
      SSESEEEEEEEEEE_____+_____EE_EEESSSSSSEE  4    1   21283719
30%   SSSSSSSSSESSSSEEEEEEEEEEEEEEEEEEEE_____ EEE            5    1   21283720
      ESSSSSESSEEEE_____+_____EEEEEESEEEEE    6    1   21283721
35%   EEEEEEEEEEEEEEEE_____+_____EEEE            7    2   21283722
      EEEEEEEEEEEEEE_____+_____EEEEEEEEEEEE    8    2   21283723
40%   EEEEEEEEEEEEEEEEEEEEEEEEEEEEEEEEE_____E               9    2   21283724
      EEEEESSEEESSEEEE_____+_____EEEESEEEEEEEE  10   SPL  21283725
45%   EEEEEEEEEEEEEEEE_EEEEEEESEEEEEEEEEEEEE_____               11    3   21283726
      EEEEEEEEEEEEEE_____+_____EEEEEEEEEEEEE  12    3   21283727
50%   EEEEEEEEEEEEEE_____EEEESSSSSSSSSSSSEE____               13    3   21283728
      SSSSSESSEEEE_____+_____EEEEEEEEEEEE   14    4   21283729

************************
   HEAD         : 8
   CYLINDER     : 6001
   START SECTOR : 1                              FIG. 7b
   END SECTOR   : 14
   ECC OTF      : ON
   ERROR TYPES  : S = NO SYNCH BYTE FOUND, E=DATA CHECK, C=CRC ERROR, O=OTHER
COMMENTS :
************************
            OFFSET STEP = 3 COUNTS = 2.34%
      ←----- % NEG OFFSET ------+------ % POS OFFSET ----→
          5          2          +          2          5
          0          5          +          5          0           SCT  SID    LBA
      -------------------------------------------------------     ---  ---    ---
          765432109876543210987654321012345678901234567
      EEEEEEEEEEEEEEEEEEEEE_____+_____EEEEEEEEEEEEEE  1    0   21286790
      EEEEEEEEEEEEEE_____+_____EEEEEEEEEEEEEE  2    0   21286791
      EEEEEEEESSEESSESSESEEE____+_____EESSSSSSSSSE    3   SPL  21286792
      EEEESSSSSEEEE_____+_____EEESESSSSEE     4    1   21286793
      EEEEEEEEEEEESSSSSSSSSSSESEE_E+_____EEEESEESESSE   5    1   21286794
      EEEEEESEEEEEEE_____+_____SSSESEESSSSS    6    1   21286795
      EEEEEEEEEEEEEEEEEEEEEEEEEEEEE_____EEEEEEEEEEEE    7    2   21286796
      EEEEEEEEEEEEEEE_____+_____EEESSSSSSSSSS   8    2   21286797
```

SYSTEM, METHOD, AND PROGRAM FOR ANALYZING OFFSET TRACK ERRORS IN A STORAGE SYSTEM

BACKGROUND OF THE INVENTION

1. Field of the Invention

The present invention relates to a method, system, and program for generating output indicating offset track errors in a storage system.

2. Description of the Related Art

Computer hard disk drives include one or more disks of magnetic storage medium and a disk drive head assembly to read and write data on the magnetic storage medium. Magnoresistive (MR) heads typically include a write element comprised of a thin film inductive head and a read element comprised of a sensor. In a magnetic disk storage medium, data is stored on concentric circular tracks on the disk, where each concentric track is divided into sectors. To write data, the head is directed to write data at the center of the track. If the head is not accurately positioned at the center, then data is written at offsets from the center of the track. Such offset track writing of data can spill over onto the adjacent concentric tracks. The situation where offset writing on one track affects the data on another track is referred to as track misregistration or track squeezing. Track misregistration is typically caused by positioning irregularities of the head with respect to the rotating disk, track interference, and head (magnetic) domain noises. Other causes of errors in disk drives are described in "Magnetic Disk Drive Technology: Heads, Media, Channel, Interfaces, and Integration," by Kanu G. Ashar (1997), which publication is incorporated herein by reference in its entirety.

Current techniques for measuring head positioning irregularities involve analyzing the signal from the head when reading data from a sector. Analysis of the signal can indicate the amount of misregistration on track. In the prior art, an oscilloscope would be used to measure the read signal to determine whether the amplitude of the read signal is unusually high or low, indicating that the head was writing the data at an offset from the track. However, a determination cannot be made as to whether a track with offset conditions is being affected by irregularities at an adjacent track or the irregularities occurred on the track being measured. Further, this inability to analyze in detail the affects of offset track writing makes it more difficult to diagnose and correct the cause of offset track writing.

This inability to diagnose with particularity the causes and source of offset track writing is especially troublesome for high end disk manufacturers, such as server class disk files. Often when customers encounter an error that cannot be corrected using the error checking codes (ECC), the customer will want to know the specific cause of the error. A general determination of track misregistration may not be sufficient to pinpoint the particular problem, such as head writing irregularities. This inability to pinpoint the problem with particularity may not only make it more difficult to diagnose and correct the problem with other disks, but also may frustrate the customer's demand for specific information and assurances. Providing detailed diagnosis of the problem is especially important in situations where the customer is an original equipment manufacturer (OEM) purchasing mass quantities of the disk file and insists on knowing specific problems with the disk file, and not just general explanations of the problems.

Thus, there is a need in the art for disk analysis tools that provide a more fine grained analysis of the track to allow for a more detailed analysis of head irregularities and their affect on a particular track.

SUMMARY OF THE PREFERRED EMBODIMENTS

To overcome the limitations in the prior art described above, preferred embodiments disclose a method, system, and program for generating and displaying disk drive performance data. A center stripe of one sector of one track on a recordable surface is read. An indication is made indicating whether the read operation to the center of the sector succeeded. Each offset stripe from the center of the track in the sector within the track is read and indication is made as to whether each read operation to each offset stripe succeeded. Output in human observable format is generated indicating whether each offset stripe and the center stripe for the sector and track were read successfully or could not be read.

In further embodiments, indication is made as to a number of the track, wherein the track includes a plurality of sectors having sector numbers. For each sector in the track, each center stripe and offset stripe is read and indication is made as to whether each read operation succeeded or failed. In such case, the generated output indicates for each sector whether each offset stripe and center stripe of each sector was read successfully or could not be read.

In still further embodiments, the human observable format comprises a human readable medium. In such case, generating the output further comprises generating the sector number of each sector in a separate row in the human readable medium and generating in each row having one sector number the output indicating whether each offset and center stripe was read successfully or could not be read.

Preferred embodiments provide a disk analysis tool for testing each offset stripe within a track to determine the affects of offset track writing. Preferred embodiments present to the disk designer information indicating the results of reading the offset stripes within a track by sector. The output results allow the disk designer or other person analyzing the data to analyze the affects of offset track writing within a particular track and analyze adjacent tracks to consider the squeeze affects of offset track writing on adjacent tracks. This detailed level of output allows the disk designer to better diagnose and correct problems with the disk head to avoid future offset track writing problems.

BRIEF DESCRIPTION OF THE DRAWINGS

Referring now to the drawings in which like reference numbers represent corresponding parts throughout:

FIGS. 4, 5, 6, 7a, and 7b illustrate output results of testing data sectors of the disk surface in accordance with preferred embodiments of the present invention;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
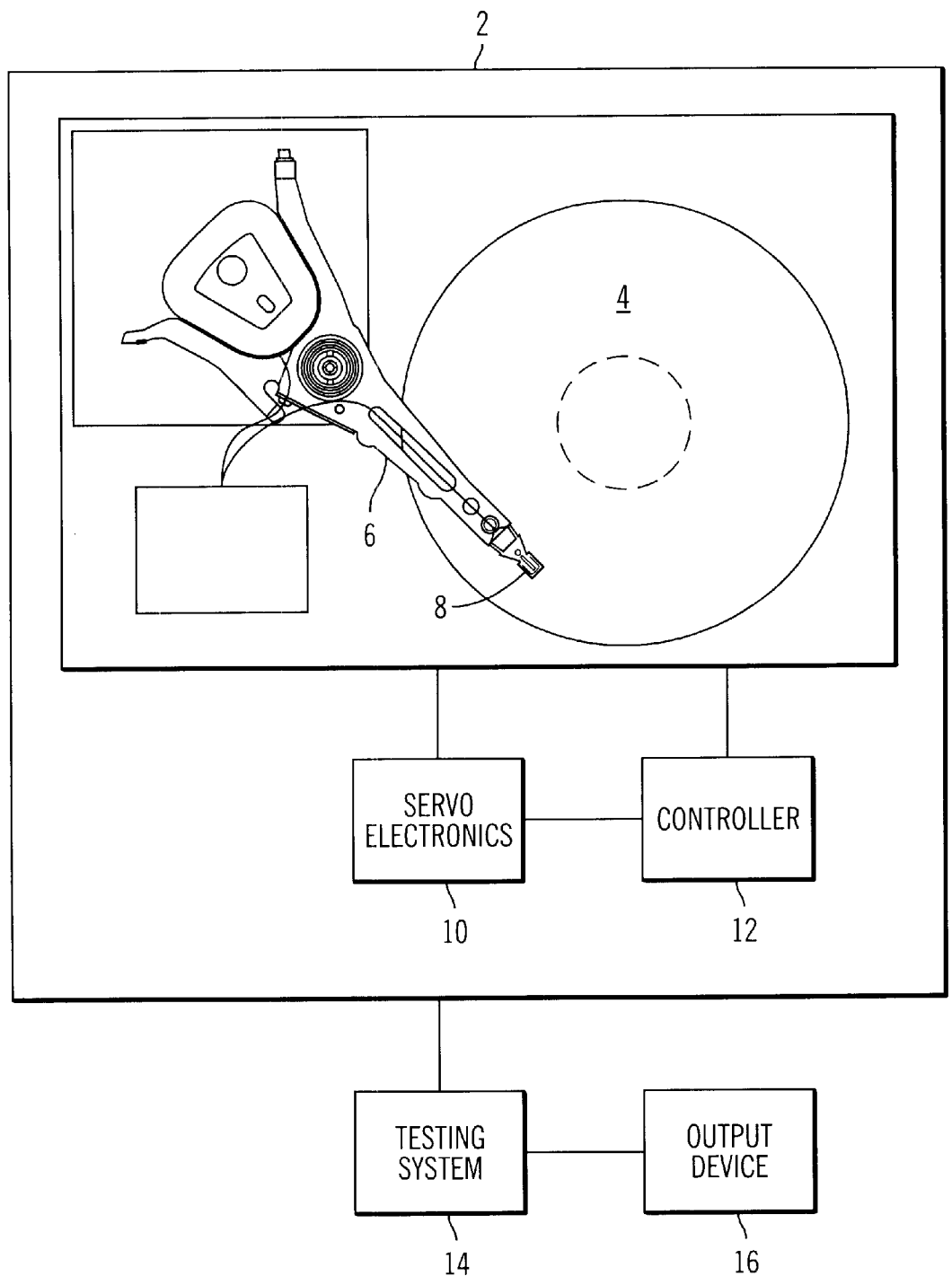
FIG. 1 is a block diagram illustrating a disk drive system in which preferred embodiments of the present invention are implemented.

FIG. 1 illustrates a disk drive system 2, including one or more rotating disks 4, an actuator assembly 6 to move a head assembly 8 across the disk 4 surface. The disk drive system 2 further includes servo electronics 10 and a controller 12 located within the disk drive assembly 2. In preferred embodiments, the head is a magnetoresistive (MR) head device. However, in alternative embodiments, the head 8 may be constructed of other materials known in the art. The servo electronics 10 provides a closed loop feed back system to ensure that data heads follow the tracks accurately and to control smooth transitions when the data head "seeks" from one track location to another track. The controller 12 manages read/write operations and controls other disk operations.

In preferred embodiments, the controller 12 would communicate information to the testing system 14, such as the results of read operations. The testing system 14 could then generate data to the output device 16 to present to the user. The testing system 14 may comprise any computing device known in the art that includes an interface to communicate with the disk controller 12 and communicate detailed read/write commands to the controller 12 to test the operations of the disk drive system 2. The output device 16 may comprise a computer display monitor or printer for printing testing results with respect to the disk 4.

Figure 2:
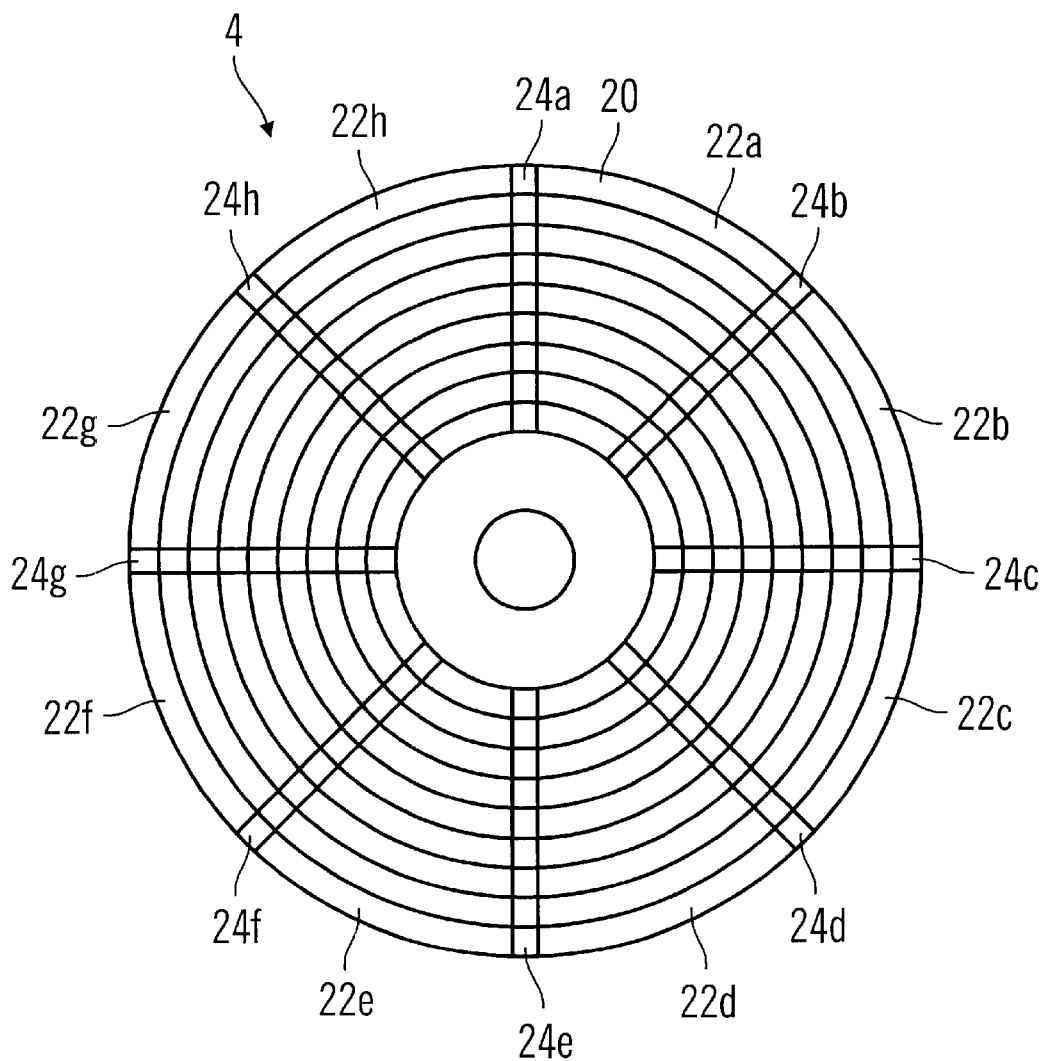
FIG. 2 illustrates the geometry of a disk drive surface as is known in the art.

FIG. 2 illustrates the arrangement of a recording disk surface 4 divided into concentric circular "tracks" on the disk surface. If there are multiple disks, then the vertical alignment of the tracks on the disks aligned in parallel together comprise a cylinder. The outer cylinder or track is shown as reference 20. Each cylinder is further divided into user data sectors 22a–h and prerecorded servo sectors 24a–h. A logical block address ("LBA") is used to address a specific location within the disk stack and is mapped by the disk drive control electronics to a cylinder or track, head number indicating a particular head in a multi-disk system, and sector.

Figure 3:
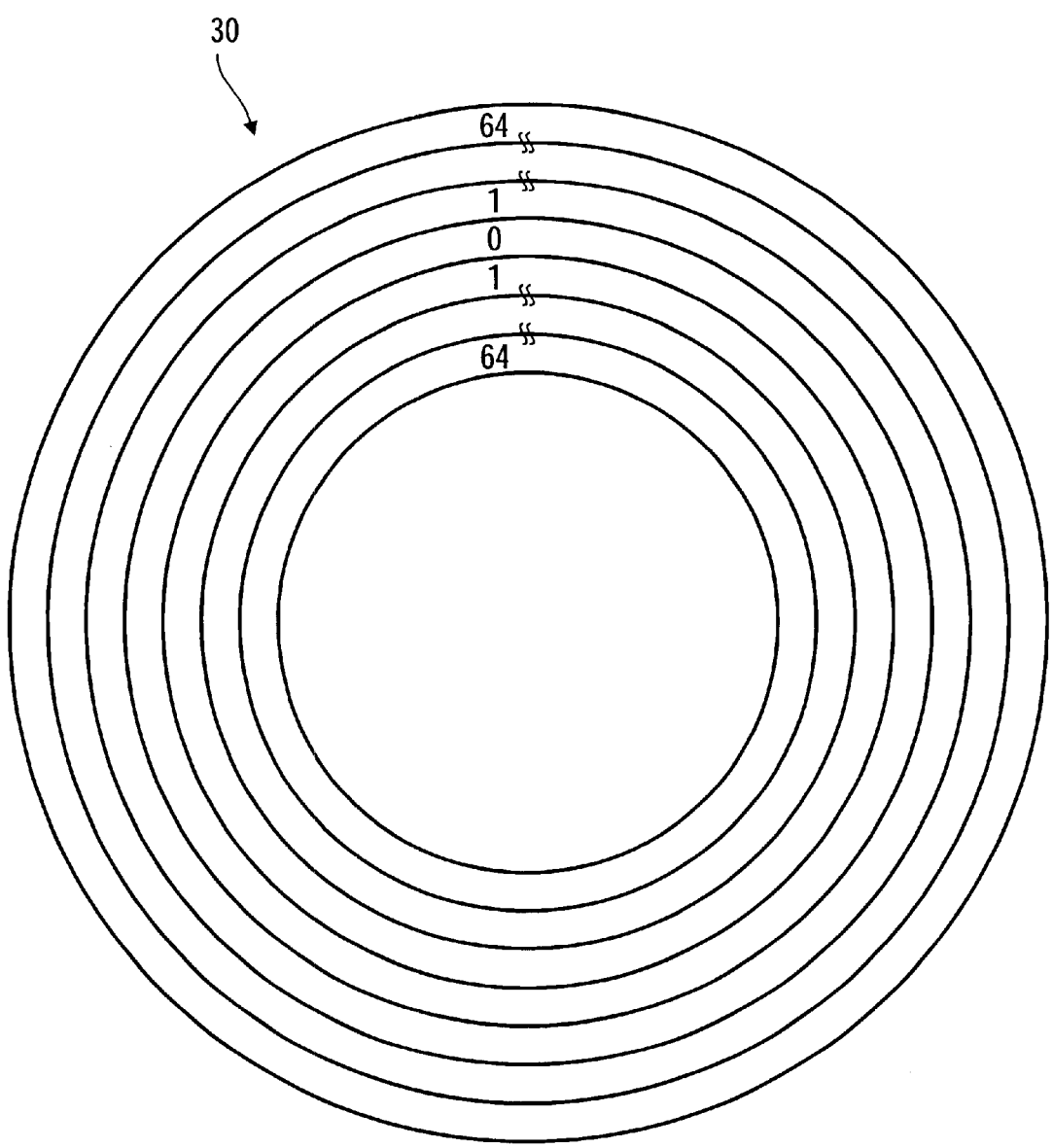
FIG. 3 illustrates the geometry of a track, including offset stripes, as is known in the art.

FIG. 3 illustrates the arrangement of one concentric circular track 30 from the disk surface 4. The track 30 has a center stripe, labeled 0. The track 30 further has concentric offset stripes moving inward and outward from the center 0 stripe, labeled 1 through 64. The offset stripes between stripe 1 and 64 are not shown. When the disk head 8 writes to a track it attempts to write to the center 0 stripe. However, irregularities may cause the head 8 to write at an offset from the center 0 stripe, which may result in misregistration and may affect adjacent tracks. The stripes offset from the center are referred to herein as "offset stripes" within a track. If the head 8 writes at an offset stripe, then the data may spill over into an adjacent track. This is referred to as "squeezing", in which the offset track writing on one track writes the data in an adjacent track.

In properly functioning disk heads 8, the head will write at an offset of 25% from the center of the track, thereby writing to 25% of the stripes immediately offset from the center stripe. Problems occur if the head 4 writes at an offset beyond 25% of the stripes from the center 0 stripe as such a substantial offset will affect the stripes on the adjacent track, thereby producing the "squeeze" effect.

Preferred embodiments provide a tool to analyze the affects of offset writing and the squeeze effect, and to determine the tracks at which offset track writing is occurring and the tracks being "squeezed" as a result of offset writing on adjacent tracks. As discussed, in the prior art, there are no tools to analyze offset stripes within a track to determine where the offset track writing and squeeze effects are occurring.

FIG. 4 illustrates output produced by the testing system 14 on the output device 16, which may be print or display output. This output shows a measurement test of cylinder 5432, including a start sector of 145 and an end sector of 180, as indicated in the upper left counter of the output. The column 40 shows each sector (SCT) number. Each row shows the test results for the particular sector identified in column 40, where the disk head 8 reads from the center and each offset stripe within the sector. Each sector row has character positions labeled in row 42. Each character position represents one or more offset stripes and the center stripe 0. The center stripe has a character position labeled zero, and the offset stripes from the center 0 are labeled 1–9, which repeat indicating further offset stripes. For each row, the servo identifier (SID) is provided, indicating the servo region including servo information for the sector indicated in the sector (SCT) column. The LBA column indicates the logical block address of the position where the offset is measured.

The disk head 8 would read each of the offsets from 0. If the head 8 reads the stripe within the sector without error, then it leaves the entry at the character position corresponding to the stripe in the sector row blank. If the head 8 reads an error, then the testing system 14 places an "E" in the entry at the character position corresponding to the stripe for which an error was read. For instance, sector 145 at row labeled 44 shows that many offsets from the center stripe 0 were read without error. This pattern is repeated for sectors 145–160, which would indicate normal read operations for those sectors. However, upon reaching sector 161, the head 8 encounters errors when reading the center stripe and stripes adjacent to the center. This indicates head 8 irregularities that occured when writing the data to the sectors 161–173 that caused the head 8 to write at significant offsets from the center stripe 0.

Thus, the output in FIG. 4 allows the disk designer to analyze the shape of offset affects in particular sectors. For instance, sectors 175–178 have an offset to the left, which may cause a squeeze to the adjacent track 5431 to the left. The irregularity of the offset from sectors 161–180 indicates that the sectors are not themselves being squeezed by an adjacent track, but are instead the result of head 8 irregularities that are causing the head 8 to write at significant offsets from the center 0 of the track to sectors 161–180.

Further, the servo ID (SID) information allows the disk designer to determine whether offset problems are the result of servo sector problems. For instance, if significant offsets are observed in sectors that span multiple servos areas (SIDs), then the offset was not corrected when transitioning from one servo region to another, which would involve reading the servo information and repositioning the head based on the servo data. This failure of the processing of the servo region to correct the offset indicates the possibility that there are problems with the servo information that is resulting in offset track writing or that there is a mechanical problem affecting the servo regions.

FIG. 5 illustrates output for cylinder or track 1000, having sectors 0–20. Data was written acceptably to sectors 0–3. However, an offset coming from the left adjacent track appears to be squeezing track 1000, as evidenced by the offset toward the left and no substantial offset to the right of the center stripe 0. At sectors 18–20, the squeeze ends, and data is written without error to these sectors.

FIG. 6 illustrates output for track 1000 showing a double sided squeeze affect on track 1000. As can be seen, sectors 7–16 show the effect of offset track writing from both adjacent tracks overwriting onto sectors 7–16, thereby squeezing those sectors. Thus, the head 8 is writing at substantial offsets on adjacent tracks 999 and 1001.

FIG. 7a illustrates the affect of squeezing sectors of track 6000 at different offsets on the left adjacent track (5999). For purpose of this illustration, the percentage of offset writing on the left adjacent track 599 is shown in the left column. For sector 1 of the left adjacent track 5999, the offset to the left was 20%, producing the squeeze effect on sector 1 of track 6000, shown in FIG. 7a. The squeeze affects of 20% and 25% shown in FIG. 7a on sectors 1 and 3 are not significant, and likely within an acceptable range of error. However, an offset of 30% in track 5999 would cause the squeeze affect shown for sector 5 in FIG. 7a, which causes errors across the center 0 of the track, The even numbered sectors do not have any offset applied from the left adjacent track 5999. The output results of FIG. 7a indicate that offset writing up to 25% is acceptable.

The squeeze affect for sector 13 of an offset in left adjacent track 5999 of 50% is particularly troublesome because the head 8 would read the data in sector 13 and enter an error recover mode because of the errors (E) across the center of track 6000. During error recovery, the head 8 would attempt to read at offsets from the center 0 of the track to locate data, i.e., in the offsets having blank spaces. However, the head could not be certain of whether the data on the left between the runs of errors (E) is from the left adjacent track 5999 or from the current track, as the blank spaces on the right of the offset may include the data from the current track 6000. However, reviewing the output of FIG. 7a, the disk designer would recognize the problem because the output shows the pattern of errors for each sector within a track.

FIG. 7b also shows a squeeze affect on track 6001 from the left as a result of offset writing on the left adjacent track 6000. The disk designer can readily ascertain that the misregistration is a result of a squeeze from the left as there are no inappropriate offsets on the right side of the center 0 of the track.

Thus, the output results shown in FIGS. 4, 5, 6, and 7a, b allow the disk designer to determine how the head 8 is writing at offsets within a track and the affect of offset writing on adjacent tracks.

Figure 8:
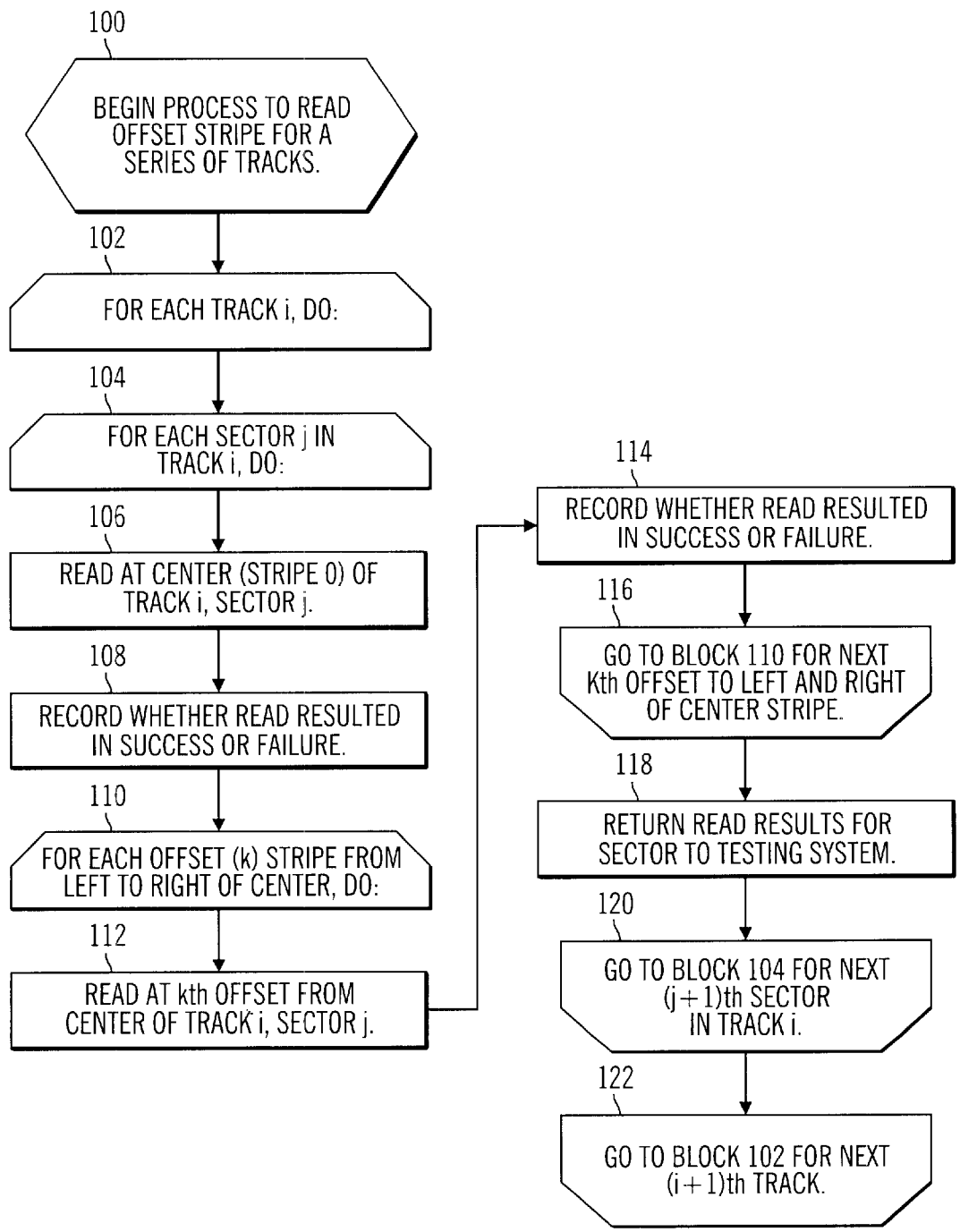
FIG. 8 illustrates logic implemented in the disk controller for testing the offset stripes within a sector and track in accordance with preferred embodiments of the present invention.

FIG. 8 illustrates logic implemented in the controller 12 for generating the output shown in FIGS. 4, 5, 6, and 7a, b. Control begins at block 100 with the controller 12 beginning a process to read offset stripes within each track on the disk drive surface. The controller 12 may begin such operations in response to requests from the testing system 12 to test each stripe within a sector and track for errors. At block 102, the controller 12 begins a loop to read each sector j in track i (at bock 104).

For each sector j in each track i, the controller 12 starts by reading (at block 106) the center stripe 0 in track i. The controller 12 records (at block 108) the result of reading the stripe within the sector j, i.e., success or failure. For each offset stripe k to the left and right (at block 110), the controller 12 reads (at block 112) at the kth offset stripe from the center of track i, sector j. The controller 12 records (at block 114) whether the read resulted in a success or failure. After recording the result, the controller returns to block 110 (at block 116) to read from the next (k+1)th offset to the left and right of the center stripe.

After reading all the stripes within a track i and sector j, the controller 12 returns (at block 118) the read results to the testing system 14. The controller 12 then returns (at block 120) to block 104 to process the next (j+1)th sector in track i. After reading the stripes from all the sectors within track i, the controller 12 returns (at block 122) to block 102 to process the next (i+1)th track.

Figure 9:
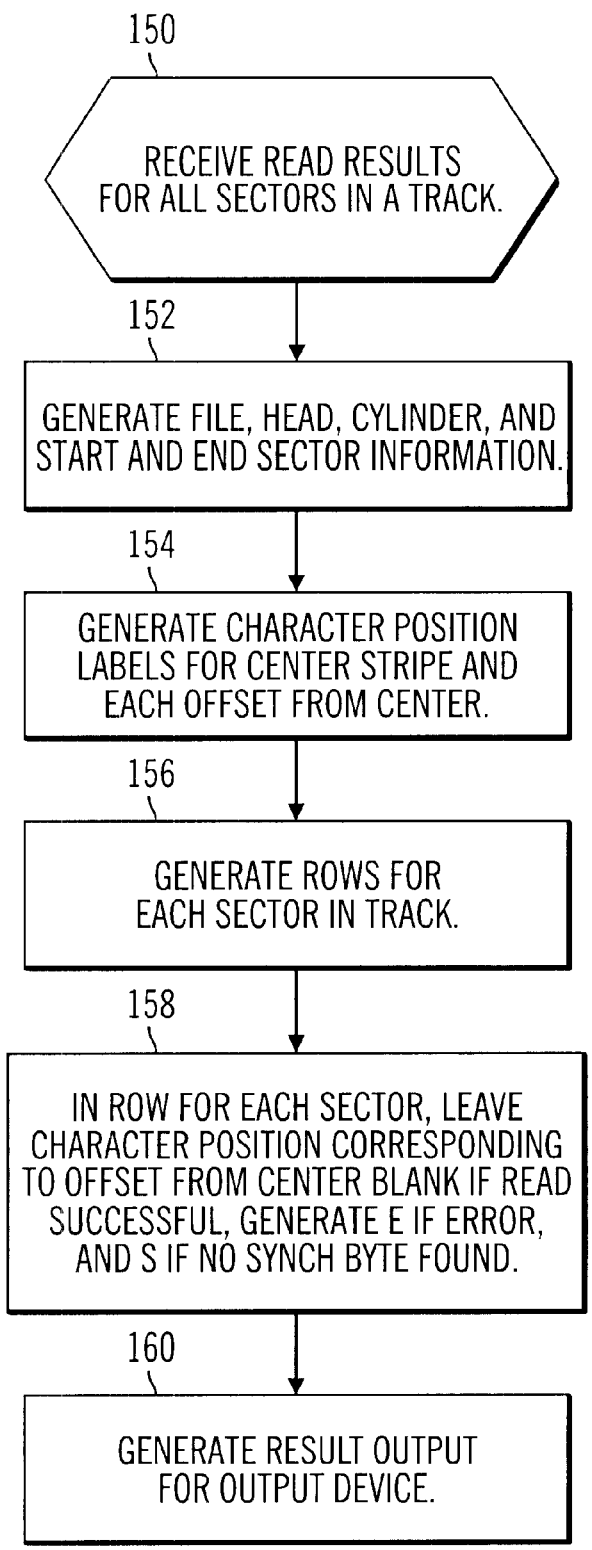
FIG. 9 illustrates logic implemented in a testing system for generating output results from the testing of the offset stripes in accordance with preferred embodiments of the present invention.

FIG. 9 illustrates logic implemented in the testing system 14 to generate the output results received from the controller 12 executing the logic of FIG. 8. Control begins at block 150 with the testing system 14 receiving the read results for all sectors in a track. The testing system 14 generates (at block 152) the file, head, cylinder, and start and end sector information for the received read results, as shown in the upper left hand corner of the output in FIGS. 4, 5, 6, 7a, b. The testing system 14 then sets up the table that will display the actual results, by generating (at block 154) a row of character position labels for the center stripe of a track and offsets from the center. In preferred embodiments, there are 50 or so displayed character position. Thus, each character position represents two stripes or offsets from the center of the track. The testing system 14 then generates (at block 156) a row for each sector in the track. In each row for a sector, the testing system 14 (at block 158) leaves a character position blank if the read result for the offset is successful, places an "E" at the character position in the row if the read result for the offset failed, or places an S in the character position if no synch byte was found. Further results may be indicated. After generating the read results in each row for each sector in the track, the testing system 14 then generates (at block 160) the results as output for the output device 16, e.g., printed matter or display on a computer monitor. The output results may appear as the data in FIGS. 4, 5, 6, 7a, b. The testing system 14 would further generate additional information, such as the sector number (SCT), servo identifier (SID), and LBA address for each row of data.

With the resulting output, the disk drive designer can diagnose with a greater level of granularity the causes of misregistration by observing on which sectors and tracks data was written with substantial offsets and which sectors and tracks were affected (squeezed) by such offsets in the writing of the data. Preferred embodiments further provide a visual display of the results of how data was written to each offset stripe from the center of a track. The techniques for presenting information on offset track writing to a disk designer will allow the disk designer to diagnose the cause of the problem and take any necessary corrective action to reduce or limit the head 4 positioning irregularities.

In the illustrated embodiments, each character position in a sector row indicates multiple offset stripes from the center stripe. In such case, if the read operation to one of the offset stripes represented by the character positioned could not be read, then the error result (E) will be displayed for that character position. In this way, every offset stripe is tested, but data is presented to the user for every two or so offset stripes. In alternative embodiments, there may be a character position for each offset stripe or, alternatively, more than two offset stripes may be grouped with a single character position for indicating whether a group of offset stripes could all be read successfully.

Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

In preferred embodiments, the controller 12 read offsets for every sector in every track. In alternative embodiments, the controller 12 may be directed to read offsets for particular user designated sectors and/or tracks. Further, an initial analysis may be used to determine which sectors and/or tracks are producing errors. After identifying problem sectors and/or tracks, the preferred logic of FIGS. 8 and 9 may then be used to further analyze any offset errors within the identified problem sectors and/or tracks.

In preferred embodiments, the output was generated by a testing system 14 interfacing with the controller 12. In alternative embodiments, the controller 12 may generate the output results and communicate them directly to the output device 14 for presentation to a user. In such case, the logic of FIG. 9 would be implemented within the logic of the controller 12. The disk controller 12 logic may be programmable, which would allow the logic to be readily configured and updated from an external source.

Preferred embodiments were described with respect to determining misregistration due to head instability with respect to MR heads. However, the preferred embodiments may be used to test any read and/or write heads other than MR heads, e.g., ferrite, MIG, thin film, GMR, one-sided, two-sided, etc., to determine non-mechanical noise arising from structural defects.

In summary, preferred embodiments disclose a system, method, and program for generating and displaying disk drive performance data. A center stripe of one sector of one track on a recordable surface is read. An indication is made indicating whether the read operation to the center of the sector succeeded. Each offset stripe from the center of the track in the sector within the track is read and indication is made as to whether each read operation to each offset stripe succeeded. Output in human observable format is generated indicating whether each offset stripe and the center stripe for the sector and track were read successfully or could not be read.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating and displaying disk drive performance data, comprising:
   reading a center stripe of one sector of one track on a recordable surface;
   indicating whether the read operation to the center of the sector succeeded;
   reading each offset stripe from the center of the track in the sector within the track;
   indicating whether each read operation to each offset stripe succeeded; and
   generating output in human observable format indicating whether each offset stripe and the center stripe for the sector were read successfully or could not be read.

2. A method for generating and displaying disk drive performance data, comprising:
   indicating a number of a track, wherein the track includes a plurality of sectors having sector numbers;
   for each sector in the track, reading each center stripe and offset stripe;
   indicating whether each read operation to each sector in the track succeeded or failed; and
   generating output in human observable format indicating for each sector whether each offset stripe and center stripe of each sector was read successfully or could not be read.

3. The method of claim 2, wherein the human observable format comprises a human readable medium, and wherein generating the output further comprises:
   generating the sector number of each sector in a separate row in the human readable medium; and
   generating in each row having one sector number the output indicating whether each offset and center stripe was read successfully or could not be read.

4. The method of claim 3, further comprising generating in each row the servo identifier indicating the servo region providing position information for the sector indicated for the row.

5. The method of claim 3, further comprising generating a row of character positions indicating the center stripe and a plurality of offset stripes from the center stripe, wherein the generated output indicating whether one stripe was read successfully or not is generated in the sector row at the character position representing the stripe.

6. The method of claim 5, wherein each character position represents the read operation results with respect to at least two offset stripes within the track, wherein the read operation at the entry of a character position is successful if all offset stripes associated with the character position were read successfully.

7. The method of claim 1, wherein the output is generated for every sector in each track on the recordable surface.

8. The method of claim 1, wherein the output is generated for user specified tracks and sectors on the recordable surface.

9. A system for generating and displaying disk drive performance data, comprising:
   means for reading a center stripe of one sector of one track on a recordable surface;

means for indicating whether the read operation to the center of the sector succeeded;

means for reading each offset stripe from the center track in the sector within the track;

means for indicating whether each read operation to each offset stripe succeeded; and means for generating output in human observable format indicating whether each offset stripe and the center stripe for the sector were read successfully or could not be read.

10. A system for generating and displaying disk drive performance data, comprising:

means for indicating a number of a track, wherein the track includes a plurality of sectors having sector numbers;

means for reading, for each sector in the track, each center stripe and offset stripe;

means for indicating whether each read operation succeeded or failed; and generating output in human observable format indicating for each sector whether each offset stripe and center stripe of each sector was read successfully or could not be read.

11. The system of claim 10, wherein the human observable format comprises a human readable medium, and wherein the means for generating the output further comprises:

means for generating the sector number of each sector in a separate row in the human readable medium; and means for generating in each row having one sector number the output indicating whether each offset and center stripe was read successfully or could not be read.

12. The system of claim 11, further comprising means for generating in each row the servo identifier indicating the servo region providing position information for the sector indicated for the row.

13. The system of claim 11, further comprising means for generating a row of character positions indicating the center stripe and a plurality of offset stripes from the center stripe, wherein the generated output indicating whether one stripe was read successfully or not is generated in the sector row at the character position representing the stripe.

14. The system of claim 13, wherein each character position represents the read operation results with respect to at least two offset stripes within the track, wherein the read operation at the entry of a character position is successful if all offset stripes associated with the character position were read successfully.

15. The system of claim 9, wherein the output is generated for every sector in each track on the recordable surface.

16. The system of claim 9, wherein the output is generated for user specified tracks and sectors on the recordable surface.

17. An article of manufacture for use in generating and displaying disk drive performance data, the article of manufacture comprising computer useable media including at least one computer program capable of causing the control logic to perform:

reading a center stripe of one sector of one track on a recordable surface;

indicating whether the read operation to the center of the sector succeeded;

reading each offset stripe from the center of the track in the sector within the track;

indicating whether each read operation to each offset stripe succeeded; and generating output in human observable format indicating whether each offset stripe and the center stripe for the sector were read successfully or could not be read.

18. An article of manufacture for use in generating and displaying disk drive performance data, the article of manufacture comprising computer useable media including at least one computer program capable of causing the control logic to perform:

indicating a number of the track, wherein the track includes a plurality of sectors having sector numbers;

for each sector in the track, reading each center stripe and offset stripe;

indicating whether each read operation succeeded or failed; and generating output in human observable format indicating for each sector whether each offset stripe and center stripe of each sector was read successfully or could not be read.

19. The article of manufacture of claim 18, wherein the human observable format comprises a human readable medium, and wherein generating the output further comprises:

generating the sector number of each sector in a separate row in the human readable medium; and generating in each row having one sector number the output indicating whether each offset and center stripe was read successfully or could not be read.

20. The article of manufacture of claim 19, further comprising generating in each row the servo identifier indicating the servo region providing position information for the sector indicated for the row.

21. The article of manufacture of claim 19, further comprising generating a row of character positions indicating the center stripe and a plurality of offset stripes from the center stripe, wherein the generated output indicating whether one stripe was read successfully or not is generated in the sector row at the character position representing the stripe.

22. The article of manufacture of claim 21, wherein each character position represents the read operation results with respect to at least two offset stripes within the track, wherein the read operation at the entry of a character position is successful if all offset stripes associated with the character position were read successfully.

23. The article of manufacture of claim 17, wherein the output is generated for every sector in each track on the recordable surface.

24. The article of manufacture of claim 17, wherein the output is generated for user specified tracks and sectors on the recordable surface.

* * * * *